Figure 1:
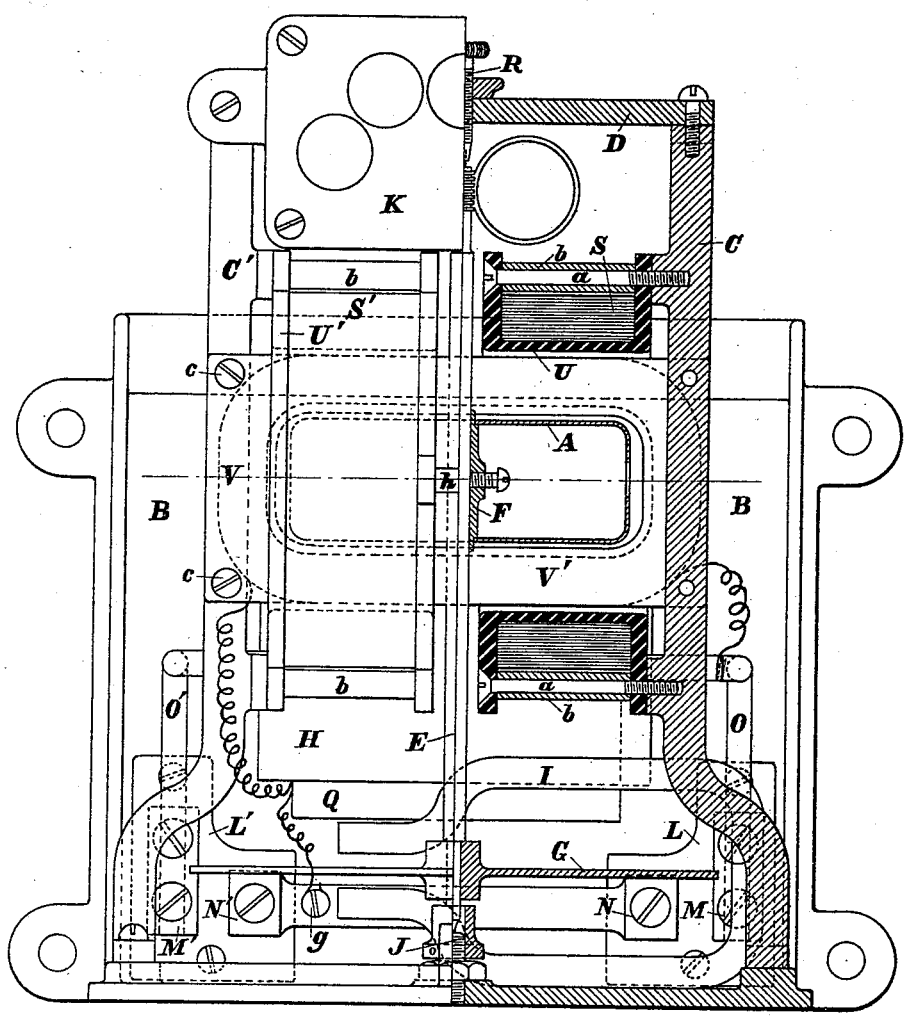

(No Model.) 3 Sheets—Sheet 1.

M. E. THOMPSON.
ELECTRIC METER.

No. 494,657. Patented Apr. 4, 1893.

WITNESSES:
E. L. Morley.
T. S. Thompson.

INVENTOR.
Milton E. Thompson
By W. W. Curry, Atty.

(No Model.) 3 Sheets—Sheet 2.
M. E. THOMPSON.
ELECTRIC METER.

No. 494,657. Patented Apr. 4, 1893.

(No Model.) 3 Sheets—Sheet 3.

M. E. THOMPSON.
ELECTRIC METER.

No. 494,657. Patented Apr. 4, 1893.

WITNESSES:   INVENTOR.

UNITED STATES PATENT OFFICE.

MILTON E. THOMPSON, OF BOSTON, MASSACHUSETTS.

ELECTRIC METER.

SPECIFICATION forming part of Letters Patent No. 494,657, dated April 4, 1893.

Application filed May 19, 1891. Serial No. 393,296. (No model.)

*To all whom it may concern:*

Be it known that I, MILTON E. THOMPSON, a citizen of the United States of America, residing at Boston, in the county of Suffolk and State of Massachusetts, have invented certain new and useful Improvements in Electric Meters, of which the following is a specification, reference being had therein to the accompanying drawings.

My invention relates to improvements in meters for making a registered measurement of electrical energy.

Heretofore great difficulty has been experienced in producing a meter which would measure alternating electrical currents with any degree of accuracy. Most of the meters brought out for this purpose so far, are of the particular type known as motor-meters, and consist, usually of a small electric motor which actuates a counting train and which is provided with some kind of a load which is intended to vary in such a way as to allow the speed of the motor to be proportional to the energy to be measured. These motor-meters have been found objectionable, first, on account of the fact that the friction of the moving parts prevents the meter from starting up under small currents, and renders the registration very inaccurate under light loads; second, the large number of turns which it is necessary to use upon the series coils which are placed directly in the circuit, causes a very great drop of potential through the meter; and third, the motors and retarding devices usually follow different laws and consequently do not balance each other, the result being very inaccurate registrations throughout most of the range of the meter.

The object of my invention is to provide a motor-meter for the measurement of alternating electric currents, which shall be free from the above objections, and which shall be simple, reliable, accurate and inexpensive to construct.

In most of the meters heretofore devised for the measurement of alternating electric currents, the motor has been of the particular type whose action is dependent on the principle of a rotating magnetic field. Such motors, as usually constructed do not develop a torque directly proportional to the energy passing through them but more nearly proportional to the square of the current, and fans, revolving either in air or in some liquid have usually been used for retarding devices. The resisting moment of such retarding devices is not directly proportional to the speed of rotation, but to some higher power, and in most cases it does not seem to follow any well defined law. As a consequence, the retarding device does not properly balance the power developed by the motor and inaccurate registration of the meter is the result. Now I have discovered that a motor constructed upon the principles and after the manner hereinafter described will develop a torque directly proportional to the energy passing through the motor. By loading this motor with a retarding device whose resisting moment is directly proportional to the speed of rotation, I get a speed of rotation of the motor shaft which is directly proportional to the electrical energy I wish to measure, and the addition of some mechanism for counting the number of revolutions of the motor is all that is necessary to produce an electric meter which shall accurately register the amount of energy passing through it.

My invention consists then, first, of an electric motor of peculiar construction, as hereinafter described, and which develops an amount of power directly proportional to the energy to be measured.

My invention consists, second, of a retarding device whose resisting moment increases in proportion to the speed, and which serves as a load for the motor, thus serving to keep the movement of the motor proportional to the energy to be measured.

My invention consists, further, of a counting train for recording the number of revolutions of the motor and thus affording a measure of the electrical energy passing through the current.

Figure 2:
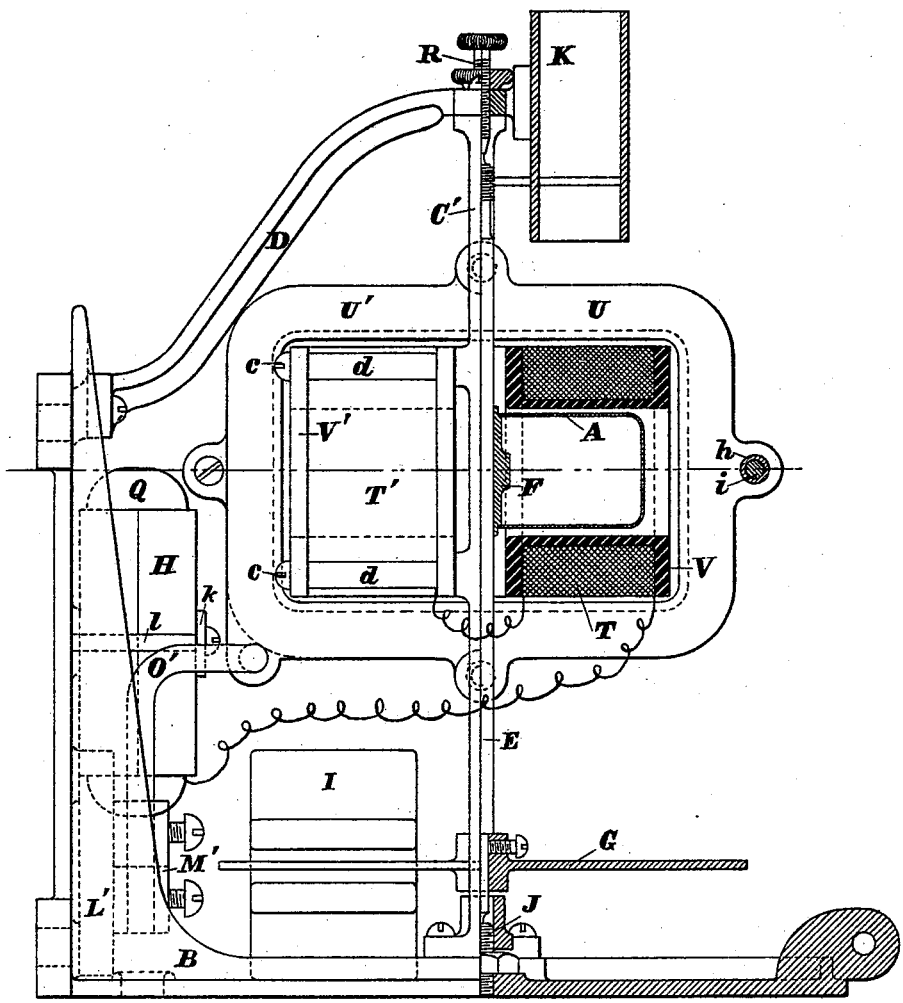
Figures 3, 4, 5, 6:
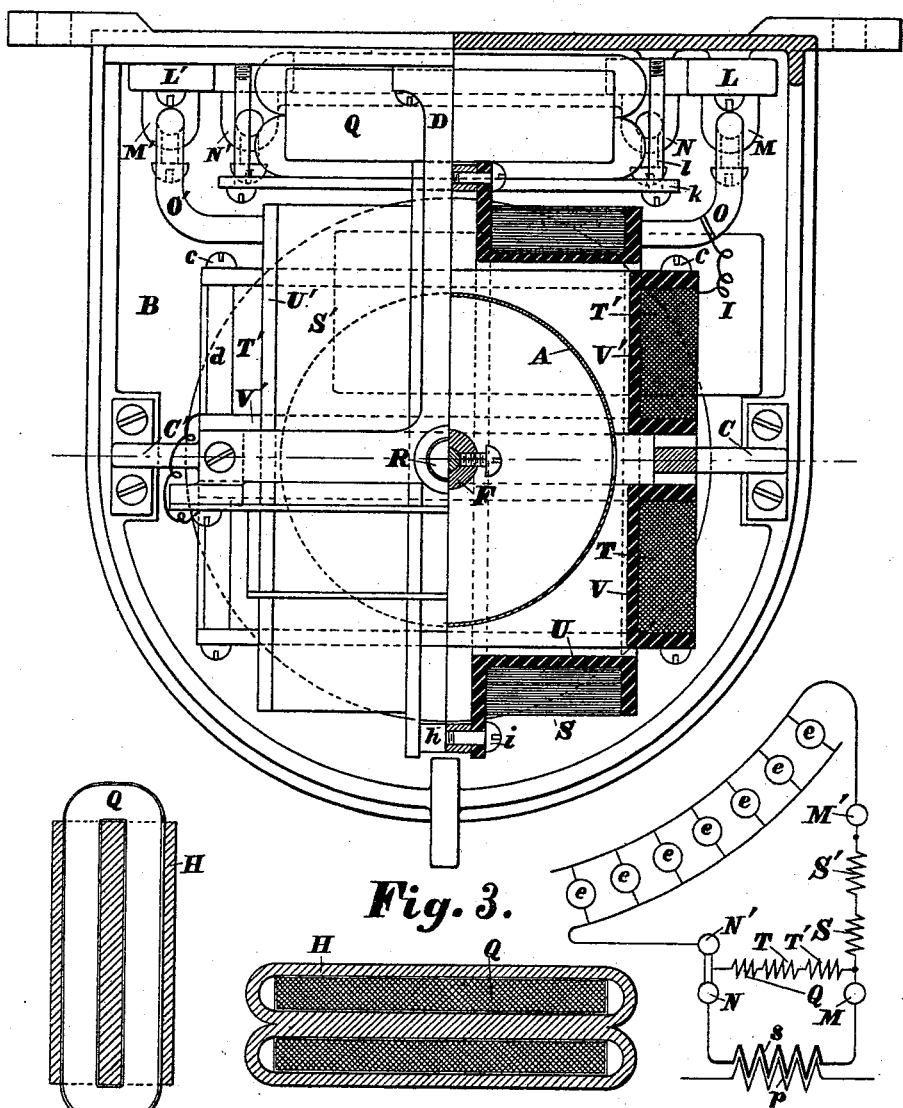

In the accompanying drawings, Figure 1 is a front view of the meter, the right half being sectioned through the center of the shaft so as to show the internal construction. Fig. 2 is a side view of the meter, partly sectioned as before. Fig. 3 is a plan view of the meter, the right half being sectioned through the center of the armature. Figs. 4 and 5 are section views showing details of the construction of the inductive resistance. Fig. 6 is a diagram showing one of the various methods of connecting the meter in the circuit.

Referring to Figs. 1, 2 and 3, S and S' are the series coils which carry the current to be measured. These coils consist of a few turns of heavy wire or of a copper ribbon wound upon spools U U' made of wood, vulcanite or other insulating material. The two coils are connected together in series and the other ends are connected, one by means of the wire O' to the binding post M', and the other by means of the wire O to the binding post M. T and T' are the shunt coils and are arranged with their axis perpendicular to the axis of the series coils, so that there will be no induction between the series coils and the shunt coils. These shunt coils are wound with small wire upon the spools V V' as shown. The spools U U' and V V' are secured to the standards C C' by means of screws $a$, $a$, &c., and $c$, $c$, &c., as shown. Standards C and C' are connected together at the top by means of the T shaped piece D, which carries the counting train K, and also the adjustable bearing R. This bearing supports the upper end of the shaft E, the lower end turning in a jeweled step bearing J, as shown. Shaft E, carries the armature A, mounted so as to revolve freely inside the field coils U U' and V V'. The armature A, consists of a closed metallic circuit, made of such shape as to embrace as many as possible of the magnetic lines produced by the field coils. There are many different ways of constructing the armature, the essential point being to secure a closed metallic circuit around the magnetic lines of the field, and this regardless of the relative positions of the armature and the field coils. The armature may be built up of some light non-metallic core or frame work wound with one or more closed circuits of wire, or it may be made of a metallic casting forming a closed circuit or a number of closed circuits, or, as I prefer, it may be a hollow cylinder of copper or other good conducting material. The cylindrical part may be continuous, or it may be laminated by longitudinal saw cuts. In general, the construction of the armature may be varied to meet various conditions of practice, the essential point being, as before stated, to secure a closed conductor, which, in any position, shall embrace as many as possible of the magnetic lines of the field. The shaft E carries near its lower end, a disk G, of copper or other conducting material, and this disk revolves between the poles of a permanent steel magnet. An inductive resistance Q, is placed in series $w$ with the shunt coils. This inductive resistance, cross sections of which are shown in Figs. 4 and 5, consists of a coil of wire O, surrounded by a double closed magnetic circuit of iron, which gives the coil a very high coefficient of self-induction. The object of the coil is to retard the phase of the current in the shunt coils, and also to reduce the shunt current to a minimum amount without the loss of energy which a dead resistance would occasion. The shaft E, carries at its upper end a worm which engages with the gearing of the counting train K, and causes it to record the number of the revolutions of the shaft.

The whole apparatus as above described is mounted on a cast base B B, which affords suitable supports for all of the various parts. In installing the meter, wires are run from the binding posts M and N to the electrical source, which may be a dynamo electric machine or a transformer. Wires from the other posts M' and N' run to the lamps or other translating devices. The binding posts N and N' are connected by a bar as shown in Fig. 1. The method of connecting the meter in the circuit is shown in Fig. 6, which represents the meter as connected in the secondary circuit of a transformer to measure the energy consumed by incandescent lamps. $p$ represents the primary coil of the transformer, and $s$, its secondary coil. Wires from the secondary lead to the binding posts M and N, and from M' to N' to the lamps $e$, $e$, $e$, &c.

S and S' are the series coils of the meter, T and T' the shunt coils, and Q the inductive resistance. The shunt circuit is shown as connected across from near binding post M to the bar between N and N'. The right hand end may be connected between the two coils S and S' or it may be connected on the other side of the coils near the binding post M'.

Q is shown as connected between the shunt coils and the binding posts N and N'. It may also be connected between the two coils T and T' or it may be connected between those coils and the binding post M. The effect upon the action of the meter, of changing these connections as indicated, is very slight, but the connections as shown in the diagram seem to give the best results in practice.

The action of the apparatus is as follows: Two sets of armature currents are induced in the closed circuit of the armature by the series coils and by the shunt coils and each proportional to the inducing current. The armature currents induced by the shunt coils act upon the series coils and tend to produce rotation of the armature, the torque being proportional to the product of armature current by series current, or in other words to the watts being consumed in the circuit beyond the meter and which it is desired to measure. Again the armature currents induced by the series coils react upon the field established by the shunt coils and the result is as before, a torque proportional to the watts being consumed in the circuit beyond. Hence the motor develops a power which is proportional to the energy measured. The metallic conductor or disk, on being revolved across a constant magnetic field, has eddy currents set up in it which tend to oppose the motion of the disk, and the result is a retarding or resisting effect upon the motion of the disk, which is proportional to the speed of revolution. Owing to this retarding effect of the disk and magnet, the speed of the motor is kept exactly proportional to the energy which is passing through the meter, and the counting train, which records the number of revolutions of the armature, thus affords a measure of the energy which is being consumed by the lamps or other translating devices.

I do not confine myself to the special form of apparatus shown and described above, but claim broadly the general arrangement of parts and principle of operation as set forth, and they may be embodied in any forms of construction such as shall be found in practice to be best suited to the end in view.

My improvement involves a radical departure in the construction and principle of operation of motor-meters, the invention consisting, broadly, of an alternating current electric motor, operating upon the principle of a rotating magnetic field, and developing a torque directly proportional to the energy passing through it; a retarding device which develops a resisting moment directly proportional to the speed of rotation and forming a load for the motor; and mechanism for registering the number of turns of the shaft of the motor.

I make no claim upon the special arrangement of coils above described, for producing a rotating field, such an arrangement having long been in use in electric motors for various purposes. Nor do I lay claim to the method of retarding the movement of the motor by the use of disk and magnet; but

What I claim, and desire to cover by Letters Patent, is—

1. In an electric meter for the measurement of alternating electric currents, the combination with an armature consisting of a hollow closed conductor of copper or other non-magnetic conducting material, of series coils through which passes the current to be measured, and shunt coils arranged with their common axis at right angles to the common axis of the series coils and connected as a shunt across the circuit leading to the translating devices, these combined parts constituting an electric motor which develops a torque proportional to the energy passing through the motor.

2. In an electric meter for the measurement of alternating electric currents, the combination with the service wires leading from the transformer or other electrical source and carrying the current to be measured, of series coils placed in one of the service wires, shunt coils arranged with their axis perpendicular to the axis of the series coils and connected across the service wires in shunt to the lamps or other translating devices, an inductive resistance placed in series with the shunt coils, and an armature placed inside of said coils, said armature consisting of a hollow closed conductor of copper or other conducting material, substantially as shown and described.

3. In an electric meter for the measurement of alternating electric currents, the combination with series coils for the current to be measured; shunt coils arranged with their common axis at right angles to that of the series coils, and connected as a shunt across the service wires of the translating device and a shaft carrying an armature consisting of a hollow closed conductor of copper or other non-magnetic conducting material, of a retarding device consisting of a metallic conductor revolving across a constant magnetic field, and a counting train for recording the number of revolutions of the shaft, substantially as shown and described.

4. In an electric meter for the measurement of alternating electric currents, the combination with a motor consisting of a hollow closed circuit armature revolving within a rotating magnetic field produced by series coils carrying the main current together with shunt coils placed at right angles to the series coils, of a retarding device consisting of a conductor revolving across a constant magnetic field, and a counting train for recording the number of revolutions of the motor, substantially as and for the purpose described.

5. In an electric meter for the measurement of alternating electric currents, the combination with the service wires leading from the transformer or other electrical source and carrying the current to be measured, of a motor consisting of series coils and shunt coils placed at right angles to each other and surrounding a hollow closed circuit armature, a retarding device consisting of a conductor revolving across a constant magnetic field, and a counting train for registering the number of revolutions of the motor, substantially as shown and described.

6. In an electric meter for the measurement of alternating electric currents, the combination with the service wires leading from the transformer or other electrical source and carrying the current to be measured, of a motor consisting of a hollow closed circuit armature revolving within a magnetic field produced by series coils carrying the main current together with shunt coils placed at right angles to the series coils, and a retarding device consisting of a metallic conductor revolving across a constant magnetic field, substantially as shown and described.

7. In an electric meter for the measurement of alternating electric currents, the combination with a shaft carrying a commutatorless armature consisting of a hollow closed conductor, of series coils through which passes the current to be measured, shunt coils arranged with their axis perpendicular to the axis of the series coils and connected as a shunt across the service wires, an inductive resistance placed in series with the shunt coils, and a retarding device consisting of a metallic conductor mounted upon the shaft and revolving across a constant magnetic field, substantially as and for the purpose set forth.

8. In an electric meter for the measurement of alternating electric currents, the combination with the service wires leading from the transformer or other electrical source and carrying the current to be measured, of series coils placed in one of the service wires, shunt coils arranged with their axis perpendicular to the axis of the series coils, and connected across the service wires in shunt to the lamps or other translating devices, an inductive resistance placed in series with the shunt coils, a shaft upon which is mounted an armature arranged to rotate inside of the series and shunt coils, said armature consisting of a closed circuit conductor without any commutator, and a counting train for counting the number of revolutions of the said shaft, substantially as set forth and described.

9. In an electric meter for the measurement of alternating electric currents, the combination with the service wires leading from the transformer or other electrical source and carrying the current to be measured, of series coils placed in one of the service wires, shunt coils arranged with their axis perpendicular to the axis of the series coils and connected across the service wires in shunt to the lamps or other translating devices, an inductive resistance placed in series with shunt coils, a shaft carrying an armature arranged to rotate inside of the series and shunt coils, said armature consisting of a hollow closed conductor without a commutator, a retarding device consisting of a metallic conductor mounted upon the said shaft and revolving across a constant magnetic field, and a counting train for recording the number of revolutions of the said shaft, substantially as and for the purpose set forth.

In testimony whereof I affix my signature in presence of two witnesses.

MILTON E. THOMPSON.

Witnesses:
GEO. B. DAVIS,
E. L. MORLEY.